C. CALLAGHAN.
Velocipede.

No. 85,640.

Patented Jan. 5, 1869.

Witnesses:
Edmund L. Havins
James D. Sumner

Inventor
C. Callaghan
by his attorney
Frederick Curtis

CORNELIUS CALLAGHAN, OF BOSTON, MASSACHUSETTS.

Letters Patent No. 85,640, dated January 5, 1869.

IMPROVEMENT IN VELOCIPEDES.

The Schedule referred to in these Letters Patent and making part of the same.

*To all to whom these presents shall come:*

Be it known that I, CORNELIUS CALLAGHAN, of Boston, in the county of Suffolk, and State of Massachusetts, have made an invention of certain new and useful Improvements in a Species of Vehicles known as "Velocipedes;" and do hereby declare the following to be a full, clear, and exact description thereof, due reference being had to the accompanying drawings, making part of this specification, and in which—

Figure 1:
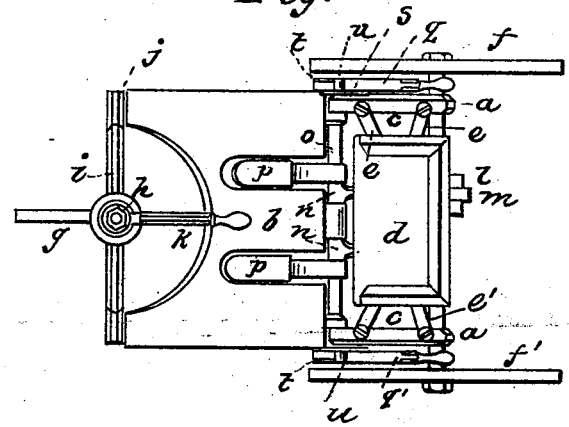
Figure 2:
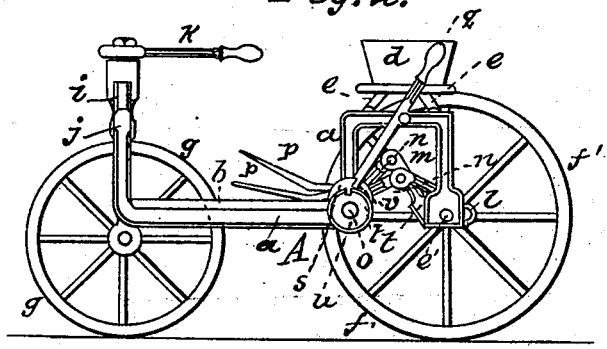

Figure 1 is a plan,

Figure 2, a side elevation, and

Figure 3:
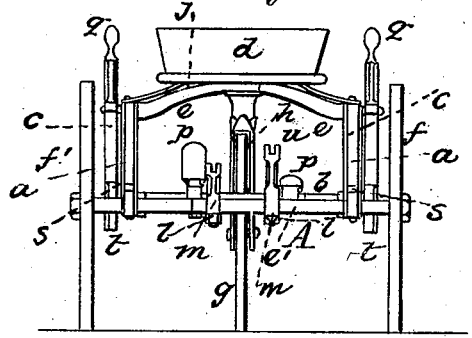

Figure 3, a rear-end elevation of a velocipede containing my invention or improvements.

The principal object sought, in making this invention, is to provide means whereby to enable the driver or rider of a velocipede to apply the power of his hands and feet together, or either alone, at pleasure, to propel the vehicle, according to varying conditions in the surface or grade of the road travelled by it, and consists in combining with the driving-axle a pair of treadles and hand-levers, in such manner, that by applying the feet to the former, and the hands to the latter, a much greater amount of power may be exerted to propel the vehicle than would be the case were either alone brought into service.

In the drawings, before mentioned as accompanying this specification, and which illustrate my invention—

A denotes the body of a velocipede, composed of side-frames or rails $a\ a$, and a platform, $b$, the rear part of each of such rails being given an upward yoke-shaped bend, $c$, for supporting the rider's seat, which is shown at $d$, such seat being supported upon springs $e\ e$, spanning the supports $c\ c$.

The rear and driving-axle is shown, at $e'$, as supported in suitable boxes applied to the ends of the side-rails $a\ a$, the wheels carried by such axle being shown at $f\ f'$ respectively, one being fixed to the axle, and revolving with it, while the other turns loosely upon such axle, such arrangement of wheels being to facilitate the turning of the vehicle in curves of comparatively small radius.

The forward and steering-wheel is shown at $g$ as supported within the lower part of a furcated post, $h$, the upper end of such post being swivelled to an arched cross-bar, $i$, extending from and connecting two posts, $j\ j$, making part of the boundary of the side-rails of the vehicle, as represented.

The upper extremity of the post $h$ is provided with a tiller or handle, $k$, for steering the wheel, such handle being pivoted to the post in such manner as to be capable of being turned up into a perpendicular position when the vehicle is running in one continued direction, in order to economize the room between the steering-wheel and the driver's seat.

The post $h$ should be provided with a suitable means of fixing it securely in position against any inclination to turn in its socket, in order to allow the vehicle to be driven with ease in any given direction in a right line.

The driving-axle $e'$ is provided with two cranks, $l\ l$, applied to each side of its centre, and at right angles to each other, such cranks being connected by rods $m\ m$ to arms $n\ n$, extending rearward at an angle of about forty-five degrees from a rocker-shaft, $o$, this shaft being disposed in front of the rear axle, and under the front edge of the driver's seat, and supported in bearings made in the side-rails $a\ a$.

Two treadles, $p\ p$, are fixed upon the shaft $o$, and alongside of the arms $n\ n$, before mentioned, and by means of which the rider is enabled, by the application of his feet, to propel the vehicle.

Upon each of the outer extremities of the shaft $o$, a hand-lever, $q$ or $q'$, is applied, the upper ends or handles of such levers being extended into such a position, with respect to the driver's seat, as to be readily grasped by the hand of the rider.

Each lever $q$ is to be connected with the shaft $o$ in such manner as to be readily clutched to, and so as to actuate such shaft, or to be disconnected from such shaft, as occasion requires, the mode adopted in the present instance to accomplish this being to affix the lower end of the lever to a disk, $s$, which encompasses the shaft loosely, and so as to be susceptible of considerable movement thereupon; while, fixed upon each outer extremity of the shaft, is a collar, $t$, such collar serving to retain the disk and lever in proper position upon such shaft.

Furthermore, the upper part of the collar $t$ is notched, as shown at $u$, in the drawings, the notch being of the proper size to receive a spur, $v$, formed upon the side of each lever $q$.

When it is desirable to apply the power of the rider's hands, in addition to that of the feet, to propel the vehicle, as, for instance, in ascending a hill, or when riding on a rough road, the hand-levers are to be depressed until their spurs $v$ extend into the notches $u\ u$ of the collars $t\ t$, when such levers become locked to the shaft $o$, and serve, in connection with the treadles, to rotate the driving-axle and wheels, and propel the vehicle.

In descending an inclined plane, or when running upon a level and smooth surface, either the hand-levers or the treadles may be used alone, without regard to the other, thus allowing the rider to rest alternately his hands and feet, and enabling a journey of great distance to be performed with much more ease than were either member employed without cessation.

If the feet alone are to be employed for any considerable length of time, the hand-levers should be elevated from contact with the collars $t\ t$, a hook, $w$, being formed upon each lever, to catch upon a pin, $x$, applied to the side-rails $a\ a$, and maintain the levers in this position until necessity or occasion requires their being brought into use.

The arrangement of the cranks upon the driving-axle, as shown in the present instance, is apt to cause such axle to stop upon the "dead-centres" of such cranks.

To avoid this, I have contemplated forming two additional cranks upon the axle, at right angles to those first mentioned, and connecting these cranks to the hand-levers, in such manner as to be operated by these levers, at the proper time, to insure against the possibility of the rotation of the axle being stopped at any particular point in its revolution.

Claims.

I claim as my invention, and desire to secure by Letters Patent of the United States, as follows:

1. As an improvement in the construction of velocipedes, combining a pair of treadles, and of disconnecting or detachable hand-levers therewith, in such manner as to be enabled to apply the power of both together, or each pair singly, as occasion requires, as and for the purpose substantially as before explained.

2. I claim the application of the hand-levers of a velocipede to its propelling-mechanism, in such manner as to be able to connect or disconnect them in respect thereto, for the purpose as before set forth and explained.

3. In the construction of velocipedes, I claim combining the tiller with the steering-post, so as to be able to turn such post into a perpendicular position, essentially in manner and for the purpose as herein shown and described.

CORNELIUS CALLAGHAN.

Witnesses:
FRED. CURTIS,
EDWARD GRIFFITH.